US008815468B2

(12) United States Patent
Paik et al.

(10) Patent No.: US 8,815,468 B2
(45) Date of Patent: Aug. 26, 2014

(54) LAYERED ELECTRODES AND MEMBRANE ELECTRODE ASSEMBLIES EMPLOYING THE SAME

(75) Inventors: Chi Paik, Brownstown Township, MI (US); Robert F. Novak, Farmington Hills, MI (US); Richard E. Soltis, Saline, MI (US); Mark S. Sulek, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 385 days.

(21) Appl. No.: 12/490,766

(22) Filed: Jun. 24, 2009

(65) Prior Publication Data
US 2010/0330452 A1 Dec. 30, 2010

(51) Int. Cl.
*H01M 8/02* (2006.01)
*H01M 8/10* (2006.01)
*C25C 7/02* (2006.01)
*C25D 17/10* (2006.01)
*H01M 4/86* (2006.01)
*H01M 4/92* (2006.01)

(52) U.S. Cl.
CPC .......... *H01M 4/8657* (2013.01); *H01M 4/8652* (2013.01); *H01M 8/1004* (2013.01); *H01M 4/92* (2013.01); *H01M 4/8668* (2013.01); H01M 2008/1095 (2013.01); Y02E 60/522 (2013.01)
USPC ............................ 429/487; 429/483; 204/280

(58) Field of Classification Search
USPC ................... 429/40, 42, 483, 487, 513, 414; 502/101; 204/280
See application file for complete search history.

(56) References Cited

U.S. PATENT DOCUMENTS

| | | | |
|---|---|---|---|
| 5,795,669 A | 8/1998 | Wilkinson et al. | |
| 7,112,386 B2 | 9/2006 | Cipollini et al. | |
| 7,135,205 B2 | 11/2006 | Smith et al. | |
| 7,332,627 B2 | 2/2008 | Chandross et al. | |
| 2001/0028975 A1* | 10/2001 | Narayanan et al. | 429/42 |
| 2002/0037449 A1* | 3/2002 | Binder et al. | 429/42 |
| 2002/0058172 A1* | 5/2002 | Datz et al. | 429/30 |
| 2002/0068213 A1 | 6/2002 | Kaiser et al. | |
| 2002/0192533 A1 | 12/2002 | Gebhardt et al. | |
| 2003/0040433 A1 | 2/2003 | Case | |
| 2003/0219641 A1* | 11/2003 | Petillo | 429/38 |
| 2005/0008926 A1* | 1/2005 | Yamamoto | 429/41 |
| 2005/0037255 A1 | 2/2005 | Ozaki et al. | |
| 2005/0095355 A1 | 5/2005 | Leistra et al. | |
| 2006/0269824 A1* | 11/2006 | Hampden-Smith et al. | 429/40 |
| 2007/0154780 A1 | 7/2007 | Huang et al. | |
| 2008/0124606 A1* | 5/2008 | Lin et al. | 429/33 |
| 2008/0206616 A1* | 8/2008 | Atanassova et al. | 429/30 |
| 2009/0029235 A1* | 1/2009 | Brenner et al. | 429/42 |
| 2009/0253013 A1* | 10/2009 | Onishi | 429/30 |

FOREIGN PATENT DOCUMENTS

| | | | | |
|---|---|---|---|---|
| EP | 1155465 | | 3/2002 | |
| EP | 1347527 | | 9/2003 | |
| JP | 2008181753 A | * | 8/2008 | ............. H01M 4/96 |

* cited by examiner

*Primary Examiner* — Kenneth Douyette
(74) *Attorney, Agent, or Firm* — Damian Porcari; Brooks Kushman P.C.

(57) ABSTRACT

According to at least one aspect of the present invention, a layered catalyst having an active area is provided. In at least one embodiment, the layered electrode includes a first catalyst layer having a first noble metal concentration and a first ionomer concentration, and a second catalyst layer disposed next to the first catalyst layer, the second catalyst layer having a second noble metal concentration different from the first noble metal concentration and a second ionomer concentration different from the first ionomer concentration. In at least another embodiment, the metallic alloy includes a metallic alloy of platinum, nickel, and cobalt.

20 Claims, 2 Drawing Sheets

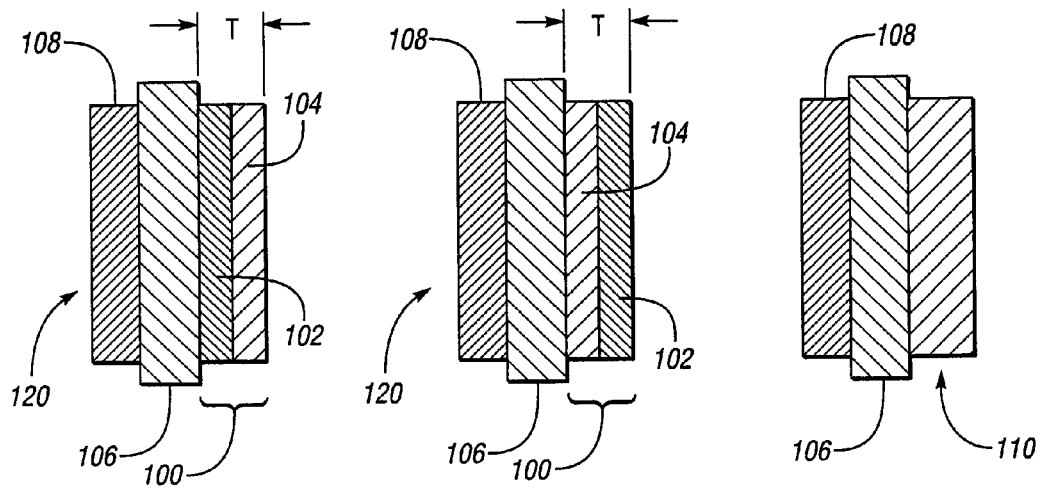
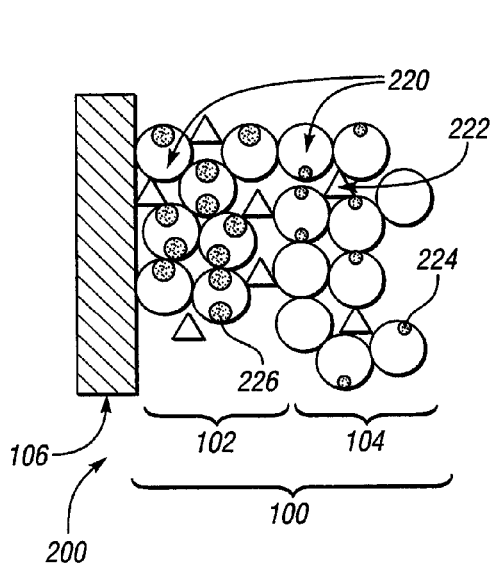
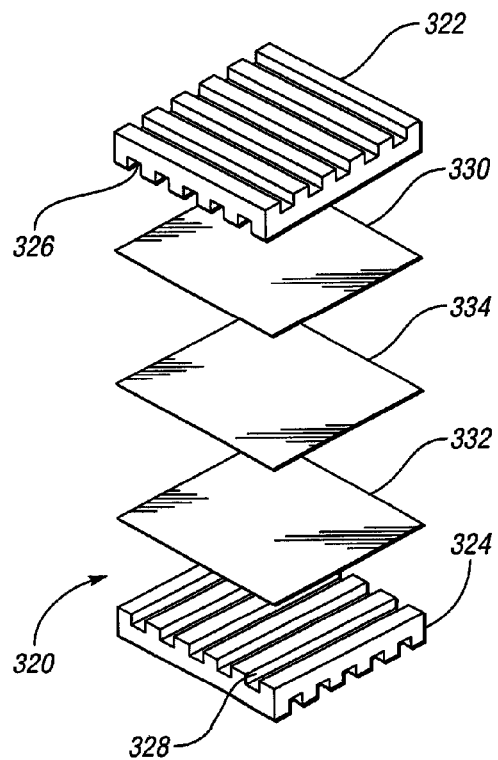

LAYERED ELECTRODES AND MEMBRANE ELECTRODE ASSEMBLIES EMPLOYING THE SAME

BACKGROUND

1. Technical Field

Embodiments of the present invention relate to layered electrodes and membrane electrode assemblies employed the same for use in fuel cells.

2. Background Art

A fuel cell generally includes two electrodes, an anode and a cathode, separated by an electrolyte. The electrodes are electrically connected through an external circuit, with a resistance load lying in between them. Solid polymer electrochemical fuel cells in particular employ a membrane electrode assembly (MEA) containing a solid polymer electrolyte membrane (PEM), also known as a proton exchange membrane, in contact with the two electrodes.

Current fuel cell technologies use noble metals in the anode and/or the cathode electrode(s) as reaction catalyst and platinum has been widely used as the reaction catalyst.

Unfortunately, PEM fuel cells typically use 0.4 to 0.8 milligram platinum per square centimeter of the fuel cell catalytic surface, corresponding to 60 to 120 grams platinum per fuel cell vehicle. There is a need to reduce the use of noble metals, such as platinum, such that production cost efficiency can be effectively maximized in fuel cell applications.

SUMMARY

According to at least one aspect of the present invention, a layered electrode having an active area is provided. In at least one embodiment, the layered electrode includes a first catalyst layer having a first noble metal concentration and a first ionomer concentration, and a second catalyst layer disposed next to the first catalyst layer, the second catalyst layer having a second noble metal concentration different from the first noble metal concentration and a second ionomer concentration different from the first ionomer concentration.

The first and the second catalyst layer may each independently contain a metallic alloy of at least one noble metal and at least one base metal. In certain particular instances, the metallic alloy is an alloy of platinum, nickel, and cobalt. The metallic alloy of platinum, nickel, and cobalt is optionally supported on a substrate.

In at least yet another embodiment, the first noble metal concentration is 0.01 to 0.38 milligrams of platinum per square centimeter of the catalytic surface.

In at least yet another embodiment, the second noble metal concentration is 0.01 to 0.38 milligrams of platinum per square centimeter of the active area.

In at least yet another embodiment, the sum of the first noble metal concentration and the second noble metal concentration is 0.39 milligrams or less of platinum per square centimeter of the active area per electrode.

In at least yet another embodiment, the first catalyst layer contains an amount of ionomer in a range of 0.1 to 10 dry weight percent of the total weight of the first catalyst layer.

In at least yet another embodiment, a combined thickness of the first and the second catalyst layers is present in a range of from 2 to 20 micrometers.

According to at least another aspect of the present invention, a membrane electrode assembly having an active area is provided. In at least one embodiment, the membrane electrode assembly includes an ionic exchange membrane; a first catalyst layer disposed next to the ionic exchange membrane, the first catalyst layer having a first platinum concentration; and a second catalyst layer disposed next to the first catalyst layer, the second catalyst layer having a second platinum concentration different from the first platinum concentration; wherein at least one of the first and the second catalyst layers contains an alloy of platinum, nickel, and cobalt.

According to at least yet another aspect of the present invention, a membrane electrode assembly having an active area for use in a fuel cell is provided. In at least one embodiment, the membrane electrode assembly includes an ionic exchange membrane; a first catalyst layer disposed next to the ionic exchange membrane and having a first platinum concentration; and a second catalyst layer disposed next to the first catalyst layer, the second catalyst layer having a second platinum concentration different from the first platinum concentration; wherein the sum of the first platinum concentration and the second platinum concentration is no greater than 0.4 milligrams per square centimeter of the active area.

BRIEF DESCRIPTION OF THE DRAWINGS

FIG. 1A schematically depicts a layered catalyst electrode having a layered electrode according to one embodiment of the present invention;

FIG. 1B schematically depicts a layered catalyst electrode having a layered electrode according to another embodiment of the present invention;

FIG. 1C schematically depicts a non-layered catalyst electrode in comparison to the layered catalyst electrodes in relation to FIG. 1A or FIG. 1B;

FIG. 2 schematically depicts the layered electrode of FIG. 1A in an enlarged view;

FIG. 3 schematically shows an exemplary fuel cell; and

DETAILED DESCRIPTION OF EMBODIMENTS OF THE PRESENT INVENTION

Figure 4:
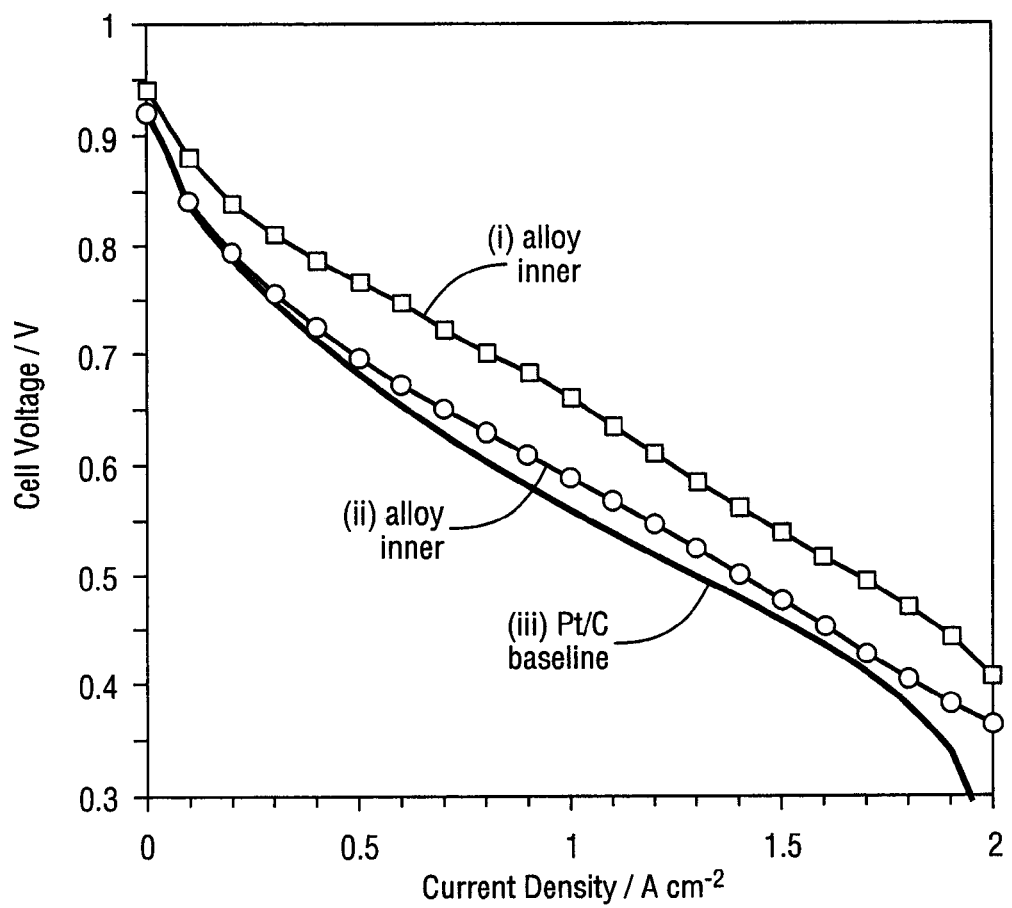
FIG. 4 shows variable voltage generation as a function of current density compared among three membrane electrode assemblies as depicted in FIGS. 1A-1C.

Reference will now be made in detail to compositions, embodiments, and methods of the present invention known to the inventors. However, it should be understood that disclosed embodiments are merely exemplary of the present invention which may be embodied in various and alternative forms. Therefore, specific details disclosed herein are not to be interpreted as limiting, rather merely as representative bases for teaching one skilled in the art to variously employ the present invention.

Except where expressly indicated, all numerical quantities in this description indicating amounts of material or conditions of reaction and/or use are to be understood as modified by the word "about" in describing the broadest scope of the present invention. Practice within the numerical limits stated is generally preferred.

The description of a group or class of materials as suitable for a given purpose in connection with one or more embodiments of the present invention implies that mixtures of any two or more of the members of the group or class are suitable. Description of constituents in chemical terms refers to the constituents at the time of addition to any combination specified in the description, and does not necessarily preclude chemical interactions among constituents of the mixture once mixed. The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

As a component for a fuel cell adapted for use in a mobile vehicle, catalysts for both the anode and cathode electrodes have been increasingly investigated in automobile research and development for improved cell power generation.

Catalysts employing noble metals generally have greater catalytic activity and specificity than the base metal catalysts. However, these noble metals are much less plentiful and much more costly than the base metals. The high cost coupled with the limited availability of the noble metals has impacted some large scale applications such as fuel cell vehicle productions. The current state of the art typically requires about ⅓ to ½ ounce of platinum for a fuel cell vehicle. Because the total annual mining production of platinum is only about 5 million ounces, and further because platinum has numerous other important uses which are deemed to use up a substantial amount of the annual mined platinum, reducing the use of noble metals such as platinum in the fuel cell vehicle production has been a long felt but unmet need.

It has been found, and according to one or more embodiments of the present invention described hereinafter, that the consumption of noble metals as electrochemical catalyst adapted for use in a fuel cell application can be substantially reduced by the employment of a layered electrode. When presented in a layered configuration as described herein, the layered electrode exhibits a relatively higher voltage output, and consequently a lower consumption of the noble metals such as platinum is realized. Without being limited to any theories, an explanation to the observed higher cell voltage output is at least partly due to a synergistic interplay between the catalyst layers with a suitable loading differential of the noble metal between the layers.

For the purpose of illustration, an exemplary fuel cell 320 is schematically depicted in FIG. 3. The fuel cell 320 includes a pair of bi-polar plates 322 and 324 having grooves 326 and 328 formed at a predetermined interval on both sides of each of the bi-polar plates 322 and 324. The fuel cell 320 also includes an ionic exchange membrane 334 disposed between the bi-polar plates 322 and 324, a first electrode such as an air electrode 332 disposed between the ionic exchange membrane 334 and the bi-polar plate 324, and a second electrode such as a fuel electrode 330 disposed between the ionic exchange membrane 334 and the bi-polar plate 322.

The bi-polar plates 322 and 324 are for electrically connecting the air electrode 332 and the fuel electrode 330, and preventing fuel and air (an oxidizer) from being mixed. The grooves 326 and 328 are used as fuel and air passages in the cells connected end to end.

In operation, air is brought into contact with the air electrode 332, while at the same time, hydrogen gas is brought into contact with the fuel electrode 330 as fuel, which results in separation of the hydrogen gas into hydrogen ions and electrons on the fuel electrode 330. These hydrogen ions are combined with water to move to the air electrode 332 side in the ionic exchange membrane 334, while the electrons move via on external circuit (not shown) to the air electrode 332 side. In the air electrode 332, oxygen, electrons, and hydrogen ions react to generate water.

When reactant gases are fed to respective electrodes 330, 332, triple phase interface involving a gaseous phase (reactant gas), a liquid phase (solid polyelectrolyte membrane), and a solid phase (catalyst supported on each electrode) is formed. The electrochemical reactions include the following: On the anode side $H_2 \rightarrow 2H^+ + 2e^-$. On the cathode side: $\frac{1}{2} O_2 + 2H^+ + 2e^- \rightarrow H_2O$. The hydrogen ($H^+$) ions formed on the anode side migrate to the cathode side through the solid polyelectrolyte membrane, while electrons migrate to the cathode side through an external load. On the other hand, on the cathode side, oxygen contained in the oxidizing agent gas reacts with the $H^+$ ions and electrons coming from the anode side to form water. Thus, the solid polyelectrolyte type fuel cell generates direct electric current from hydrogen and oxygen while forming water.

It has been found, according to one or more embodiments of the present invention, that conventional fuel cells often are confronted with technical difficulties in two main aspects. One aspect of difficulty lies in uncontrollable massive use of noble metals for catalyzing hydrogen generation reactions and hence impractical cost efficiency per a given energy production. The other aspect of difficulty lies in insufficient water management, or flooding, at the cathode, a situation that worsens in response to various parameters. Some of the parameters include increased electrode thickness, decreased proton transport, and uncoupled water removal. In particular situations, cathode flooding occurs when water production at the oxygen reduction reaction and electroosmotic drag of water to the cathode exceed the water removal rate resulting from air based advection, evaporation, and back diffusion. Liquid water that builds up at a fuel cell cathode decreases performance and inhibits robust operation. Flooding in the cathode reduces oxygen transport to reaction sites and decreases the effective catalyst area. Cathode flooding can result in a catastrophic decrease of performance.

It has further been discovered that a layered electrode according to one or more embodiments of the present invention effectively reduces noble metal consumption while maintaining acceptable cost efficiency. It has also been discovered that the layered electrode of the present invention effectively potentiates water management akin to the fuel cell environment through the employment of multiple catalyst layers a concurrent increase in proton conductivity and in some instance with a concurrent reduction in the total thickness of the layered electrode.

In at least one embodiment, the layered electrode includes a first catalyst layer having a first noble metal concentration and a first ionomer concentration, and a second catalyst layer disposed next to the first catalyst layer, the second catalyst layer having a second noble metal concentration different from the first noble metal concentration and a second ionomer concentration different from the first ionomer concentration.

As used herein and unless otherwise indicated, the term "ionomer concentration" presents to a level of proton conductivity and hence an extent of hydrophilicity.

Without being limited to a particular theory, one possible reason underlying the benefits afforded by the layered electrode according embodiments of the present invention is that layering configuration of the noble metals provides a noble metal content differential and hence an advantageous gradient of catalytic kinetics in the direction of hydrogen flow for the hydrogen generation reaction. By varying the catalytic kinetics along the hydrogen flow, the rate of catalysis can be designed in sync with the differential hydrogen and oxygen flow inherent to hydrogen fuel cell applications.

In at least one embodiment, the first and the second ionomer concentration values can be modified to vary the resultant hydrophilicity of a respective catalyst layer. Examples of the ionomers include perfluorosulfonated ionomers, Nafion®, polytetrafluoroethylene (PTFE), Nafion® NRE-212, Nafion® polyaniline, sulfonated polysulfone, sulfonated poly(ether sulfone), poly(vinylidene)fluoride (PVDF), Nafion® PTFE, Nafion® Krytox, Poly(vinylidene)fluoride-chloro tetrafluoro ethylene, (PVDF-CTFE) copolymer, poly (ethylene glycol)/(4-dodecylbenzene sulfonic acid (PEG)/ (DBSA), sulfonated styrene-(ethylene-butylene)-sulfonated styrene (SEBSS), poly-(ethylene oxide)s (PEO), polyvinyl alcohol (PVA), poly-vinylidene fluoride/poly-acrylonitrile (PVDF/PAN), PVDF-g-PSSA, (poly(styrene sulfonic acid), sulfonated poly(ether ether ketone) (SPEEK), or combinations thereof.

The first and the second ionomer concentration values can range independently, based on the total dry weight of each catalyst layer, from 0.1 to 10 dry weight percent, 0.5 to 9 dry weight percent, 1.0 to 8 dry weight percent, 2.0 to 7 dry weight percent, or 3.0 to 6 dry weight percent.

The layered electrode according to one or more embodiments of the present invention having two or more catalyst layers with the ionomers strategically employed with a concentration gradient, for example, the concentration of the ionomers in the first catalyst layer is different from the ionomer concentration in the second catalyst layer, affords a synergistic enhancement of tolerance to water accumulation and improved cost efficiency through the use of less noble metal mass.

In at least another embodiment, the catalyst layers may each independently contain one or more hygroscopic fillers. Examples of the hygroscopic fillers include silica, alumina, zirconia, titania, tungsten trioxide. The layered electrode with hygroscopic fillers exhibit improved tolerance to water accumulation and hence improved thermal and mechanical stability.

As stated herein, noble metals and particularly platinum have been used conventionally in a relatively large amount in the fuel cell applications. For instance, about 1 milligrams platinum per square centimeter of the fuel cell catalytic surface is generally used and therefore, the electrode catalyst cost forms a substantial proportion of mass production of the fuel cell vehicles.

One or more embodiments of the present invention provide layered electrodes which improve hydrogen power generation in a fuel cell compartment resulting comparably reduced consumption of noble metals including platinum. Reducing the consumption of costly noble metals, while maintaining an acceptable cell voltage generation, enables improved cost efficiency adapted for mass production of the fuel cell vehicles.

According to at least one aspect of the present invention, a layered electrode is provided for improved cell voltage output adapted for use in a fuel cell. In at least one embodiment, and as illustratively depicted in FIG. 1A, a layered electrode is generally shown at 100 in relation to an ionic exchange membrane 106 and a second electrode 108. It is noted that the layered electrode 100 may be a cathode or an anode; likewise, the second electrode 108 can be an anode or a cathode, respectively.

Alternatively, and depicted in FIG. 1B, the first catalyst layer 102 is oriented away from the ionic exchange membrane 106 such that the second catalyst layer 104 is disposed between the ionic exchange membrane 106 and the first catalyst layer 102. The ionic exchange member 106, the layered electrode 100, and the second electrode 108 are collectively to form a membrane electrode assembly generally shown at 120. It is noted that the second electrode 108 may also take the layered configuration similar to the layered electrode 100.

As depicted in FIGS. 1A-1B, the layered electrode 100 includes a first catalyst layer 102 and a second catalyst layer 104 disposed side by side to each other. The first and the second catalyst layers can each independently include a metallic alloy of at least one noble metal and at least one base metal.

The first and the second catalyst layers 102, 104 may each independently contain platinum as the at least one noble metal and may each independently contain a metallic alloy of platinum, nickel, and cobalt. Examples of the platinum, nickel, and/or cobalt metallic alloys include PtNi, Pt$_3$Ni, PtCo, Pt$_3$Co, and PtNiCo. The metallic alloy can be presented as alloy particles supported on carbon black.

The noble metal illustratively includes platinum, ruthenium, palladium, rhodium iridium, gold, silver, or any alloys thereof. The base metal illustratively includes molybdenum, copper, nickel, manganese, cobalt, chromium, tin, tungsten, iron, copper, thorium, or any alloys thereof.

An alloy or a metallic alloy, as used herein and unless otherwise indicated, refers a mixture of metals wherein at least one component metal presents crystal structure that differs from respective original structure of the metal in its pure metal form.

In at least one particular embodiment, the base metal is nickel. Exemplary forms of nickel include Raney nickel, finely powered nickel black, and precipitated colloidal nickel. In at least another particular embodiment, the base metal is cobalt.

In at least yet another particular embodiment, the base metal is an alloy of cobalt and nickel. The amount of cobalt and nickel can be any suitable weight percent. For instance, the base metal alloy may contain cobalt and nickel each independently in an amount of 1 to 99 percent, 10 to 90 percent, 20 to 80 percent, 30 to 70 percent, 40 to 60 percent of the total weight of the base metal alloy.

The noble metal and/or the base metal in each of the first and the second catalyst layers may be the same or different. For instance, the noble metal component in both the catalyst layers 102, 104 may be the same to maintain a uniform electrode structure, assuming that gas diffusion properties are optimized to a predetermined level. On the other hand, the base metal component may be different for each of the layers 102, 104, wherein varied levels of base metal loading are used to optimize the electrode structure based on gas diffusion levels or properties relating to gas diffusion and ionomer concentration.

In at least yet another embodiment, the second catalyst layer 104 contains platinum as the at least one noble metal. In certain particular instances, the platinum is presented as pure metal particles supported on carbon black.

In at least yet another embodiment, a total loading of the at least one noble metal in milligrams per square centimeter (mg/cm$^2$) of the active area of the layered electrode 100, is in a range of no less than 0.01, 0.06, 0.11, 0.16, or 0.21 mg/cm$^2$ to no greater than 0.24, 0.29, 0.34, or 0.39 mg/cm$^2$.

According to one or more embodiments of the present invention, the term "active area" refers to a surface of an electrode or a membrane electrode assembly upon which hydrogen hydrolysis and proton transfer takes place. In certain particular instance, the catalytic surface is the surface area of the ionic exchange membrane upon which the anode and or the cathode is overlaid.

The first catalyst layer 102 presents a first noble metal concentration defined as an amount of noble metals in milligrams per square centimeter (mg/cm$^2$) of the active area of the layered electrode 100. Likewise the second catalyst layer 104 presents a second noble metal concentration defined as an amount of noble metals in milligrams per square centimeter (mg/cm$^2$) of the active area of the layered electrode 100.

In at least yet another embodiment, the first noble metal concentration of the first catalyst layer 102 is greater than the second noble metal concentration of the second catalyst layer 104 with a loading differential. The loading differential can be in a range of no less than 0.02, 0.06, 0.10, or 0.14 mg/cm$^2$ (milligrams per square centimeter of the active area), to no greater than 0.20, 0.26, 0.32, or 0.38 mg/cm$^2$.

In at least one embodiment, a combined thickness of the first and the second catalyst layers 102, 104 is illustratively indicated as "T" in FIG. 1A. The combined thickness is no greater than 20 micrometers, 18 micrometers, 16 micrometers, or 14 micrometers.

The combined thickness "T" of the layered electrode 100 according to one or more embodiments of the present invention is advantageously provided such that water accumulation at the cathode of a fuel cell may further be reduced. Water flooding worsens as the thickness of the cathode increases. By substantially reducing the combined thickness to no greater than 20 micrometers as compared to conventional counterpart thickness of 25 micrometers or more, the layered electrode of the present invention potentiates tolerance of a resultant electrode to water accumulation.

As stated elsewhere herein, the reduced thickness of a resultant electrode is in itself a feature derived from the advantageous layering configuration of the layered electrode according to one or more embodiments of the present invention such as the layered electrode 100 of FIGS. 1A-1B. Together, the reduced electrode thickness and a differential loading of the noble metals in the direction of hydrogen flow effectuate reduced noble metal consumption and improved water management.

The substrate 220 is generally characterized as being electrically conductive, chemically inert, and having a relatively high surface area. The conductivity of the substrate 220 may vary, and in certain applications is comparable or same to that of carbon. The substrate 220 is chemically inert such that the substrate 220 may be prevented from being reacting to the hydrogen fuel. Some examples of materials suitable for the substrate 220 include carbon black, metal nitride such as titanium nitride, metal carbide such as tungsten carbide, or any combinations thereof.

The ionic exchange membrane 106 as depicted in FIGS. 1A-1B may be sulfonic acid group-containing polystyrenic cation exchange membranes used as cationic conductive membranes, and fluorine-containing ion exchange resin membranes, typically membranes made of a mixture of a fluorocarbonsulfonic acid and polyvinylidene fluoride, membranes produced by grafting trifluoroethylene onto a fluorocarbon matrix, and perfluorosulfonic acid resin membranes. An illustrative example for the solid polyelectrolyte membrane is Nafion® membranes made by DuPont.

Further to FIGS. 1A and 1B, the layered electrode 100 is shown to include layers 102 and 104, for purpose of illustration. However, the number of layers can be greater than 2 with the proviso that the total loading across all the layers of the noble metal, such as platinum, is no greater than 0.39 milligrams per square centimeter of the active area of the layered electrode 100.

Whether or not more than two catalyst layers are used in a layered electrode or a resultant membrane electrode assembly, a combined thickness of all the catalyst layers such as the layered electrode 100 can be of any suitable value. In at least one particular embodiment, the combined thickness of the layered electrode 100 is in a range of 2 to 20 micrometers, 4 to 18 micrometers, or 6 to 16 micrometers. Notwithstanding the foregoing, the relative thickness between the first catalyst layer 102 and the second catalyst layer 104 can likewise be of any suitable value. In at least one particular embodiment, the relative thickness between the first and the second catalyst layers is in a range of no less than 1:5, 1:4, 1:3, or 1:2, to no greater than 2:1, 3:1, 4:1, or 5:1.

Any suitable methods may be employed to construct the first and the second catalyst layers 102 and 104 to preserve an overall loading concentration of the noble metal. In certain particular instances, the catalyst layers may be constructed by the same method to maintain a particular noble metal loading differential by the same methods.

The catalyst layer(s) can be applied directly on the membrane by decal method, i.e., forming a catalyst coated membrane (CCM). Catalyst ink is coated on a smooth surface, such as Kapton or Teflon film by doctor-blading, air brushing, screen printing, and/or deskjet/laser printing. The two layers can be applied in 2-step in series, applying first layer, then repeating the steps of the second layer. Different coating processes can also be utilized to form multiple layers, such as first layer can be applied by screen printing and second layer applied by air brushing.

Catalyst cosists of 20-70% catalyst powders (Pt and Pt alloys), 5-40% perfluorosulfonated ionomer (PFSI), 1-25% Teflon, additives, and solvents. Solvents can be solely or mixtures of water, ethanol, propanol, ethylene glycol, hexane, kerosene, or tetrahydrofuran.

The catalyst layer(s) can also be applied directly on the gas diffusion layer substrate by decal method, i.e., forming a catalyst coated substrate (CCS). Catalyst ink is coated on a smooth surface, such as Kapton or Teflon film by doctor-blading, air brushing, screen printing, and/or deskjet/laser printing. The two layers can be applied in 2-step in series, applying first layer, then repeating the steps for the second layer. Different coating processes can also be utilized to form multiple layers, such as first layer can be applied by screen printing and second layer applied by air brushing.

Catalyst ink cosists of 20-70% catalyst powders (Pt and Pt alloys), 5-40% perfluorosulfonated ionomer (PFSI), 1-25% Teflon, additives, and solvents. Solvents can be solely or mixtures of water, ethanol, propanol, ethylene glycol, hexane, kerosene, or tetrahydrofuran.

Additionally, a one-step process can be utilized by using two solvents with different catalyst composition and mixture weight percent (wt %). One solvent is polar solvent, such as water, and the other solvent is non-polar solvent, such as oil. The two solvent will have phase difference, and produce two layers with different catalyst composition and mixture wt %.

The catalyst layers according to embodiments of the present invention may be prepared through a "catalyst ink". The catalyst ink is illustratively prepared by combining a solution of Nafion®, tetrabutylammonium hydroxide, and a catalyst. The ink may then be transferred to a Teflon™ carrier (or other release agent that can release the ink) by painting, spraying, or other suitable method, until the required loading is achieved. For instance, an electrocatalyst ink may be prepared by mixing the noble metal with ionomer solution and tetrabutyl ammonium hydroxide. The electrocatalyst ink is allowed to mix for a sufficient period of time, e.g. 8 hours. A Teflon™ support is coated in the electrocatalyst ink solution until a desired loading is obtained.

Additionally, a compressing step may be employed in forming the catalyst layers according to embodiments of the present invention such that a desired thickness of a resultant electrode may be obtained.

In certain particular embodiment, the compressing step includes compression between about 0.5 to 4,000 psi, 100 to 3,000 psi, 200 to 2,000 psi, or 300 to 1500 psi.

According to at least another aspect of the present invention, a membrane electrode assembly having a active area is provided. In at least one embodiment, the membrane electrode assembly includes an ionic exchange membrane; a first catalyst layer disposed next to the ionic exchange membrane such that the first catalyst layer is intermediate between the ionic exchange membrane and the second catalyst layer, the first catalyst layer having a first platinum concentration; and a second catalyst layer disposed next to the first catalyst layer, the second catalyst layer having a second platinum concentration different from the first platinum concentration; wherein at least one of the first and the second catalyst layers contains an alloy of platinum, nickel, and cobalt.

According to at least yet another aspect of the present invention, a membrane electrode assembly having a active area for use in a fuel cell is provided. In at least one embodiment, the membrane electrode assembly includes an ionic exchange membrane; a first catalyst layer disposed next to the ionic exchange membrane and having a first platinum concentration; and a second catalyst layer disposed next to the first catalyst layer, the second catalyst layer having a second platinum concentration different from the first platinum concentration; wherein the sum of the first platinum concentration and the second platinum concentration is no greater than 0.39 milligrams per square centimeter of the active area.

According to at least one particular embodiment, and as depicted in FIG. 2, a membrane electrode assembly (MEA) is generally shown at 200. The MEA 200 includes an ionic exchange membrane 106, a first catalyst layer 102 having a first noble metal concentration represented by alloys of platinum, cobalt, and nickel as the catalyst 226 supported on a substrate of carbon black particles 220. The MEA 200 further includes a second catalyst layer 104 disposed next to the first catalyst layer 102 and directed away from the ionic exchange membrane 106. The second catalyst layer 104 includes a second noble metal concentration different from the first noble metal concentration and represented by platinum in pure metal form as the catalyst 224 supported on the carbon black particles 220. In this particular embodiment, the first catalyst layer also contains a matrix or ionomers 222 in a first ionomer concentration different from a second ionomer concentration of a matrix of ionomers 222 in the second catalyst layer 104.

While membrane electrode assemblies with catalyst layers according to various embodiments of present invention are discussed herein in the context of an ionic exchange membrane fuel cell, the scope of the invention is not so limited. Rather, the membrane electrode assemblies with catalyst layers of the present invention can be used for improved power per dollar return in any electrochemical cell requiring a catalyst layer on the surface of an electrode. For instance, the membrane electrode assemblies with catalyst layers can be utilized in electrocatalytic oxidation (ECO) cells. ECO cells utilize the typical structure of a standard ionic exchange membrane fuel cell, but act as a system to remove excess carbon monoxide (CO) from the fuel cell feed stream.

EXAMPLE

In this example, and as depicted in FIGS. 1A-1C, a layered electrode 100 is situated next to the ionic exchange membrane 106 as a cathode. As shown in FIG. 1A, a first catalyst layer 102 is disposed next to the ionic exchange membrane 106 and containing a metallic alloy of platinum, cobalt, and nickel. The first catalyst layer 102 has a noble metal concentration of 0.15 milligrams of platinum per square centimeter of the catalytic surface of layered electrode 100. A second catalyst layer 104 is disposed next to the first catalyst layer 102 such that the first catalyst layer 102 is sandwiched between the second catalyst layer 104 and the ionic exchange membrane 106. The second catalyst layer 104 has a noble metal concentration of 0.1 mg platinum per square centimeter of the catalytic surface of the layered electrode 100. The second catalyst layer 104 is disposed between the ionic exchange membrane 106 and the first catalyst layer 102. As such, FIG. 1A schematically depicts a fuel cell electrode arrangement having a layered electrode 100 wherein a catalyst layer 102 having a higher noble metal concentration relative to a catalyst layer 104 is disposed next to an ionic exchange membrane such as the proton exchange membrane 106.

Conversely and as depicted in FIG. 1B, the second catalyst layer 104 is disposed next to the ionic exchange membrane 106 and containing neat platinum as the noble metal contained therein. As such, FIG. 1B schematically depicts a fuel cell electrode arrange having a layered electrode 100 wherein a catalyst layer 104 having a lower noble metal concentration relative to a catalyst 102 is disposed next to an ionic exchange membrane such as the proton exchange membrane 106.

The resultant hydrogen-air performance of the layered electrodes 120 containing the layered electrode 100 is shown in FIG. 4. As demonstrated in FIG. 4, cell voltage generated from the layered electrode 120 is presented as a function of a current density and compared among the three test membrane assemblies schematically depicted in FIGS. 1A, 1B, 1C. As can be seen from FIG. 4, both assemblies of FIGS. 1A and 1B with catalyst layers generate higher cell voltage and perform better than the single layer electrode assembly of FIG. 1C. It is also noted that the assembly of FIG. 1A having a higher platinum loading disposed next to the ionic exchange membrane 106 performs even better than the assembly of FIG. 1B having a lower platinum loading disposed next to the ionic exchange membrane 106.

While the best mode for carrying out the invention has been described in detail, those familiar with the art to which this invention relates will recognize various alternative designs and embodiments for practicing the invention as defined by the following claims.

What is claimed:

1. A membrane electrode assembly comprising:
   an ionic exchange membrane;
   a first layer disposed over the ionic exchange membrane and containing a Pt—Ni—Co catalyst; and
   a second layer disposed over the first layer and containing a pure metallic Pt catalyst and not containing Ru, the Pt concentration in the Pt—Ni—Co catalyst being higher than that of the pure metallic Pt catalyst to produce a decreasing loading differential extending away from the ionic exchange membrane.

2. The membrane electrode assembly of claim 1, wherein the first layer and the second layer are included in a cathode or an anode in a fuel cell.

3. The membrane electrode assembly of claim 1, wherein the Pt concentration in the Pt—Ni—Co catalyst is 0.01 to 0.38 milligrams platinum per square centimeter of an active area of the membrane electrode assembly.

4. The membrane electrode assembly of claim 3, wherein the Pt concentration in the pure metallic Pt catalyst is 0.01 to 0.38 milligrams platinum per square centimeter of the active area.

5. The membrane electrode assembly of claim 1, wherein the sum of the Pt concentration in the Pt—Ni—Co catalyst and the pure metallic Pt catalyst is no greater than 0.39 milligrams platinum per square centimeter of an active area of the membrane electrode assembly.

6. The membrane electrode assembly of claim 1, wherein the sum of the Pt concentration in the Pt—Ni—Co catalyst and the pure metallic Pt catalyst is from 0.25 to 0.35 milligrams platinum per square centimeter of an active area of the membrane electrode assembly.

7. The membrane electrode assembly of claim 1, wherein the first layer includes a first ionomer concentration ranging from 0.1 to 10 dry wt. % of the first layer.

8. The membrane electrode assembly of claim 1, wherein a combined thickness of the first and the second layers is in a range of from 6 to 16 micrometers.

9. The membrane electrode assembly of claim 7, wherein the second layer includes a second ionomer concentration ranging from 0.1 to 10 dry wt. % of the second layer, the second ionomer concentration being different from the first ionomer concentration to produce a gradient extending away from the ionic exchange membrane.

10. The layered electrode of claim 1, wherein at least one of the first and second catalyst layers includes one or more hygroscopic fillers.

11. The membrane electrode assembly of claim 1, wherein the nickel in the Pt—Ni—Co catalyst is present in an amount ranging from 30 wt. % to 70 wt. % of the catalyst.

12. The membrane electrode assembly of claim 1, wherein the second layer is in contact with a bi-polar plate.

13. A membrane electrode assembly having an active area for catalytic reactions, comprising:
   an ionic exchange membrane;
   a first catalyst layer disposed next to the ionic exchange membrane, the first catalyst layer having a first platinum concentration, the first catalyst layer includes a first ionomer concentration ranging from 0.1 to 10 dry wt. % of the first catalyst layer; and
   a second catalyst layer disposed next to the first catalyst layer such that the first catalyst layer is intermediate between the ionic exchange membrane and the second catalyst layer, the second catalyst layer having a second platinum concentration lower than the first platinum concentration, the second catalyst layer includes a second ionomer concentration ranging from 0.1 to 10 dry wt. % of the second catalyst layer, the second ionomer concentration being different from the first ionomer concentration;
   wherein the first catalyst layer includes an alloy of at least platinum and cobalt and the second catalyst layer contains a pure metallic Pt catalyst and no other metals.

14. The membrane electrode assembly of claim 13, wherein the alloy includes platinum, nickel, and cobalt.

15. The membrane electrode assembly of claim 13, wherein the first platinum concentration is 0.01 to 0.38 milligrams platinum per square centimeter of the active area.

16. The membrane electrode assembly of claim 13, wherein the second platinum concentration is 0.01 to 0.38 milligrams platinum per square centimeter of the active area.

17. The membrane electrode assembly of claim 13, wherein the sum of the first platinum concentration and the second platinum concentration is no greater than 0.39 milligrams platinum per square centimeter of the active area.

18. The membrane electrode assembly of claim 13, wherein at least one of the first and second catalyst layers includes one or more hygroscopic fillers.

19. A membrane electrode assembly having an active area for use in a fuel cell, comprising:
   an ionic exchange membrane;
   a first catalyst layer disposed next to the ionic exchange membrane and having a first platinum concentration, the first catalyst layer includes a first ionomer concentration ranging from 0.1 to 10 dry wt. % of the first catalyst layer; and
   a second catalyst layer disposed next to the first catalyst layer such that the first catalyst layer is intermediate between the ionic exchange membrane and the second catalyst layer, the second catalyst layer having a second platinum concentration lower than the first platinum concentration, the second catalyst layer includes a second ionomer concentration ranging from 0.1 to 10 dry wt. % of the second catalyst layer;
   wherein the sum of the first platinum concentration and the second platinum concentration is no greater than 0.39 milligrams per square centimeter of the active area;
   and wherein the first catalyst layer includes an alloy of platinum, nickel, and cobalt and the second catalyst layer consists essentially of supported pure metallic Pt particles.

20. The membrane electrode assembly of claim 19, wherein a combined thickness of the first and the second catalyst layers is in a range of from 2 to 20 micrometers.

* * * * *